United States Patent
Durante et al.

(10) Patent No.: US 7,694,563 B2
(45) Date of Patent: Apr. 13, 2010

(54) MICROELECTROMECHANICAL INTEGRATED SENSOR STRUCTURE WITH ROTARY DRIVING MOTION

(75) Inventors: Guido Spinola Durante, Gavirate (IT); Alessandro Balzelli Ludovico, Cornaredo (IT); Sarah Zerbini, Cornaredo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 279 days.

(21) Appl. No.: 11/684,243

(22) Filed: Mar. 9, 2007

(65) Prior Publication Data

US 2007/0214883 A1    Sep. 20, 2007

(30) Foreign Application Priority Data

Mar. 10, 2006    (EP) .................................. 06425163

(51) Int. Cl.
*G01P 9/04*    (2006.01)
*G01C 19/00*    (2006.01)

(52) U.S. Cl. .............................. 73/504.12; 73/504.04

(58) Field of Classification Search .............. 73/504.08, 73/504.09, 504.11, 504.04, 504.12, 504.14, 73/514.32, 514.16, 514.29
See application file for complete search history.

(56) References Cited

U.S. PATENT DOCUMENTS

| | | | | |
|---|---|---|---|---|
| 5,889,207 | A * | 3/1999 | Lutz ......................... | 73/504.13 |
| 6,062,082 | A | 5/2000 | Guenther et al. | |
| 6,189,381 | B1 * | 2/2001 | Huang et al. ............. | 73/504.12 |
| 6,244,111 | B1 * | 6/2001 | Funk | |
| 6,250,157 | B1 * | 6/2001 | Touge ...................... | 73/504.12 |
| 6,308,567 | B1 | 10/2001 | Higuchi et al. | |
| 6,349,597 | B1 * | 2/2002 | Folkmer et al. .......... | 73/504.02 |
| 6,374,672 | B1 * | 4/2002 | Abbink et al. ........... | 73/504.12 |
| 6,508,124 | B1 | 1/2003 | Zerbini et al. | |
| 6,513,380 | B2 * | 2/2003 | Reeds et al. ............. | 73/504.12 |
| 6,626,039 | B1 * | 9/2003 | Adams et al. | |
| 6,715,352 | B2 * | 4/2004 | Tracy | |
| 6,837,107 | B2 * | 1/2005 | Geen ........................ | 73/504.04 |
| 6,894,576 | B2 * | 5/2005 | Giousouf et al. ............ | 331/154 |

(Continued)

FOREIGN PATENT DOCUMENTS

| | | |
|---|---|---|
| DE | 19641284 | 5/1998 |
| DE | 102004017480 | 10/2005 |
| EP | 0971208 A2 | 1/2000 |
| EP | 1253399 A1 | 10/2002 |
| EP | 1365211 A1 | 11/2003 |

(Continued)

*Primary Examiner*—Helen C. Kwok
(74) *Attorney, Agent, or Firm*—Lisa K. Jorgenson; Robert Iannucci; Seed IP Law Group PLLC

(57) ABSTRACT

A driving mass of an integrated microelectromechanical structure is moved with a rotary motion about an axis of rotation, and a first sensing mass is connected to the driving mass via elastic supporting elements so as to perform a first detection movement in a presence of a first external stress. The driving mass is anchored to an anchorage arranged along the axis of rotation by elastic anchorage elements. An opening is provided within the driving mass and the first sensing mass is arranged within the opening. The elastic supporting and anchorage elements render the first sensing mass fixed to the driving mass in the rotary motion, and substantially decoupled from the driving mass in the first detection movement. A second sensing mass is connected to the driving mass so as to perform a second detection movement in a presence of a second external stress. A first movement is a rotation about an axis lying in a plane, and a second movement is a linear movement along an axis of the plane.

28 Claims, 7 Drawing Sheets

U.S. PATENT DOCUMENTS

| | | | |
|---|---|---|---|
| 6,918,298 B2 * | 7/2005 | Park | 73/504.16 |
| 7,100,446 B1 * | 9/2006 | Acar et al. | 73/504.13 |
| 7,258,012 B2 * | 8/2007 | Xie | 73/514.32 |
| 2002/0189352 A1 | 12/2002 | Reeds, III et al. | |
| 2006/0070441 A1 | 4/2006 | Durante et al. | |
| 2009/0064780 A1 * | 3/2009 | Coronato et al. | 73/504.08 |

FOREIGN PATENT DOCUMENTS

| | | |
|---|---|---|
| EP | 1617178 A1 | 1/2006 |
| EP | 1624286 A1 | 2/2006 |
| WO | 00/29855 | 5/2000 |
| WO | 02/103364 A2 | 12/2002 |

* cited by examiner

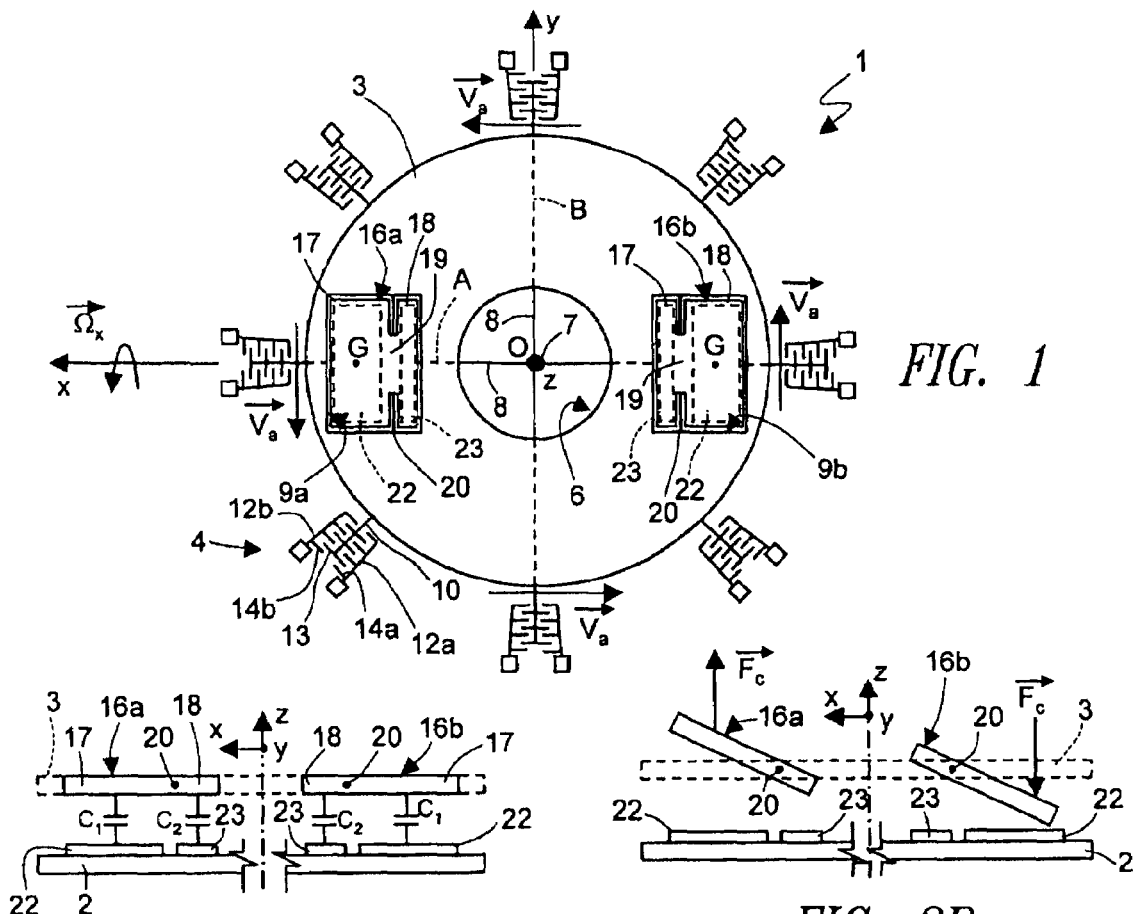
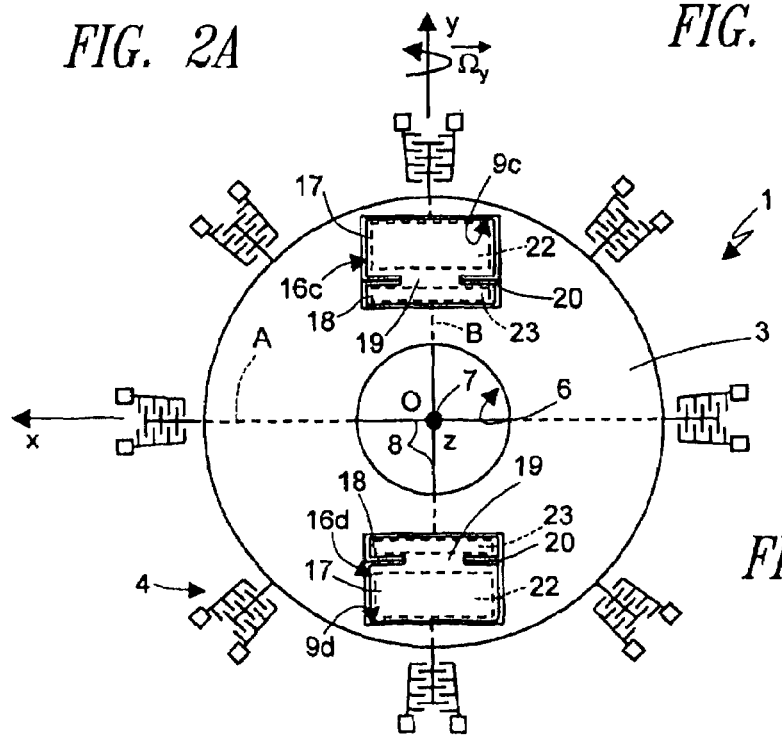

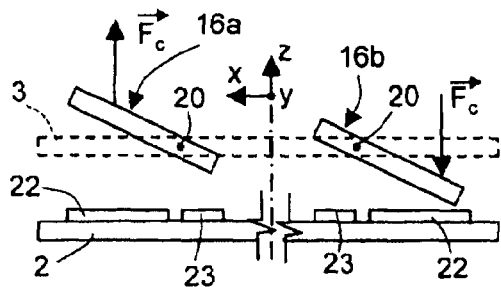
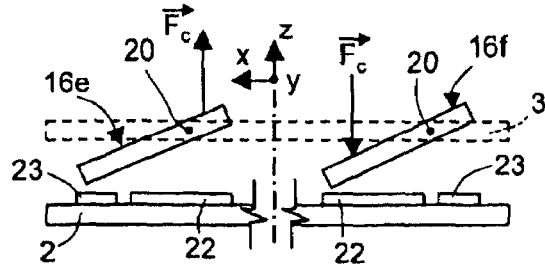
*FIG. 6A*  *FIG. 6B*
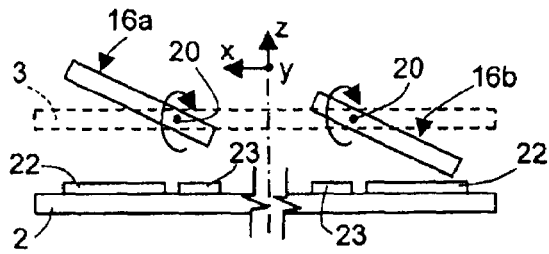
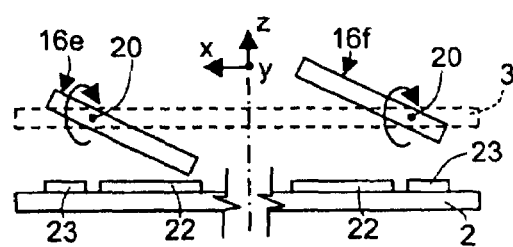
*FIG. 6C*  *FIG. 6D*
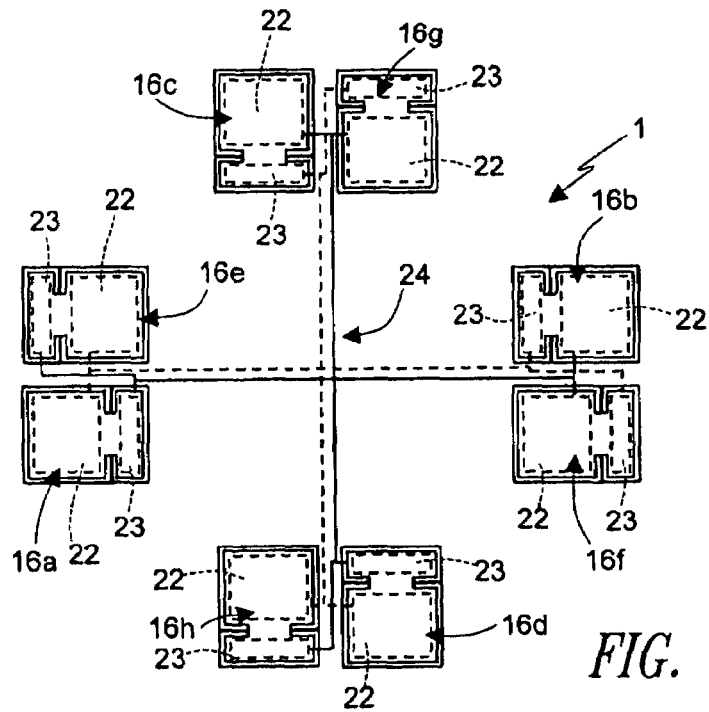
*FIG. 7*

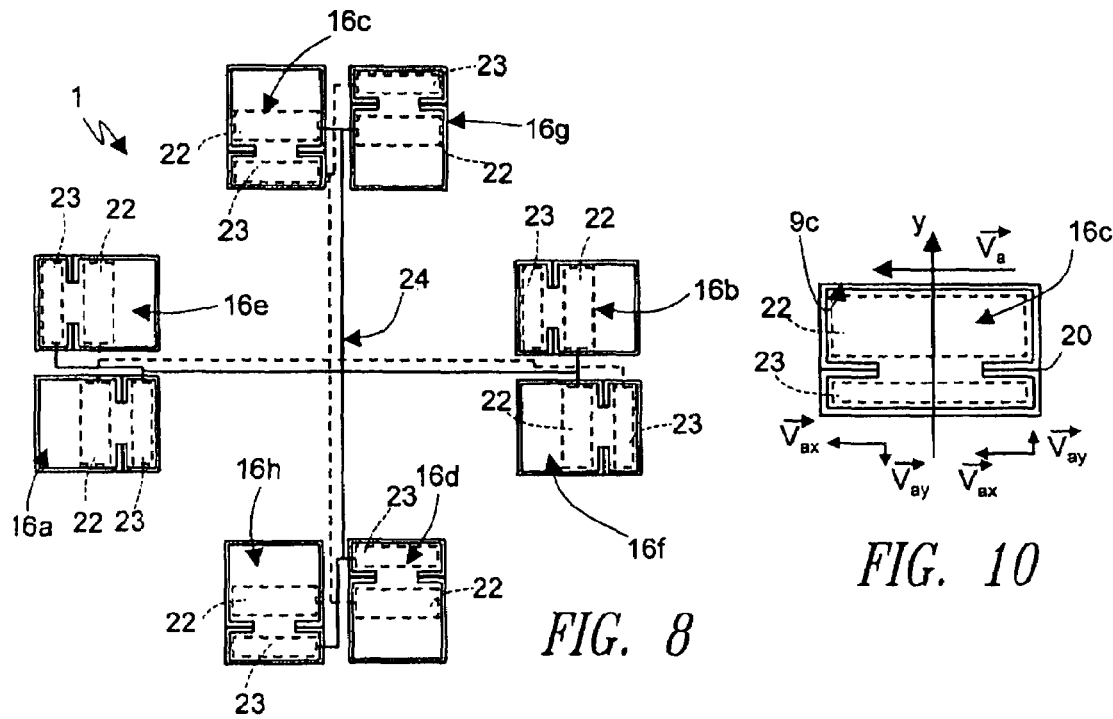
FIG. 8
FIG. 10
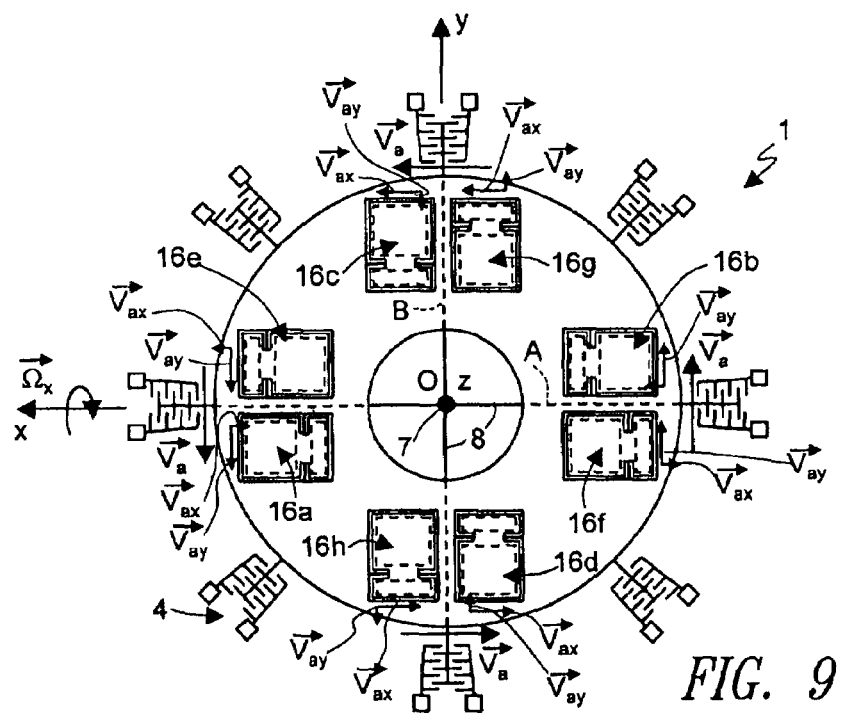
FIG. 9

MICROELECTROMECHANICAL INTEGRATED SENSOR STRUCTURE WITH ROTARY DRIVING MOTION

BACKGROUND OF THE INVENTION

1. Field of the Invention

The present invention relates to a microelectromechanical integrated sensor structure having a rotary driving motion. In particular, in the following description reference will be made to a gyroscope (whether uniaxial, biaxial, or triaxial), which can possibly operate as an accelerometer (whether uniaxial, biaxial, or triaxial).

2. Description of the Related Art

As is known, microprocessing techniques enable formation of microelectromechanical structures or systems (the so-called MEMS) within layers of semiconductor material, which have been deposited (for example, in the case of a layer of polycrystalline silicon) or grown (for example, in the case of an epitaxial layer) on top of sacrificial layers, which are removed by chemical etching. Inertial sensors, accelerometers and gyroscopes obtained with said technology are encountering an increasing success, for example in the automotive field, in inertial navigation, or in the sector of portable devices.

In particular, integrated semiconductor gyroscopes are known, which are made with MEMS technology. Said gyroscopes operate according to the theorem of relative accelerations, exploiting Coriolis acceleration. When an angular velocity is imparted on a movable mass that is moving with a linear velocity, the movable mass "feels" an apparent force, referred to as Coriolis force, which determines a displacement thereof in a direction perpendicular to the direction of the linear velocity and to the axis of rotation. The movable mass is supported via springs that enable a displacement thereof in the direction of the apparent force. According to Hooke's law, said displacement is proportional to the apparent force, and consequently, from the displacement of the movable mass, it is possible to detect the Coriolis force and the angular velocity that has generated it. The displacement of the movable mass can, for example, be detected capacitively, by measuring, in resonance conditions, the variations in capacitance caused by the movement of movable electrodes, integrally fixed to the movable mass and comb-fingered to fixed electrodes.

Examples of embodiment of integrated gyroscopes of a MEMS type are described in EP-A-1 253 399 and EP-A-1 365 211, filed in the name of the present applicant, which relate to gyroscopes with a rectilinear driving motion, or else in WO 02/103364 and U.S. Pat. No. 6,062,082, which relate to gyroscopes with rotary driving motion.

In general, gyroscopes of a known type are not completely satisfactory for what concerns simplicity of production, reduction in dimensions, efficiency, and immunity to disturbance. In addition, microelectromechanical structures of a known type enable a limited configurability. Furthermore, rejection of external interference (for example, due to spurious linear or angular accelerations) is critical.

BRIEF SUMMARY OF THE INVENTION

One embodiment of the present invention provides an integrated microelectromechanical structure that enables the aforesaid advantages and problems to be overcome, and in particular is compact, simple to manufacture, and has a high detection efficiency and configurability.

According to one embodiment of the present invention, an integrated microelectromechanical structure is consequently provided as defined in the present disclosure.

BRIEF DESCRIPTION OF THE SEVERAL VIEWS OF THE DRAWINGS

For a better understanding of the present invention, preferred embodiments thereof are now described purely by way of non-limiting examples and with reference to the attached drawings, wherein:

FIG. 1 is a schematic top plan view of a microelectromechanical structure according to a first embodiment of the present invention;

FIGS. 2a-2b are schematic lateral sections of parts of the structure of FIG. 1, respectively in the absence and in the presence of a Coriolis force;

FIG. 3 is a schematic top plan view of a variant of the structure of FIG. 1;

FIGS. 6a-6d are schematic lateral sections of parts of the structure of FIG. 5, showing displacements of sensing masses;

FIG. 7 is a layout of the structure of FIG. 5, showing connections between capacitors;

FIG. 8 is a layout similar to that of FIG. 7, of a variant of the structure of FIG. 5;

FIG. 9 is a schematic top plan view of the structure of FIG. 5, showing the driving velocity of corresponding sensing masses;

FIG. 10 is a schematic top plan view similar to that of FIG. 9, of a portion of the structure of FIG. 4;

DETAILED DESCRIPTION OF THE INVENTION

Figure 4:
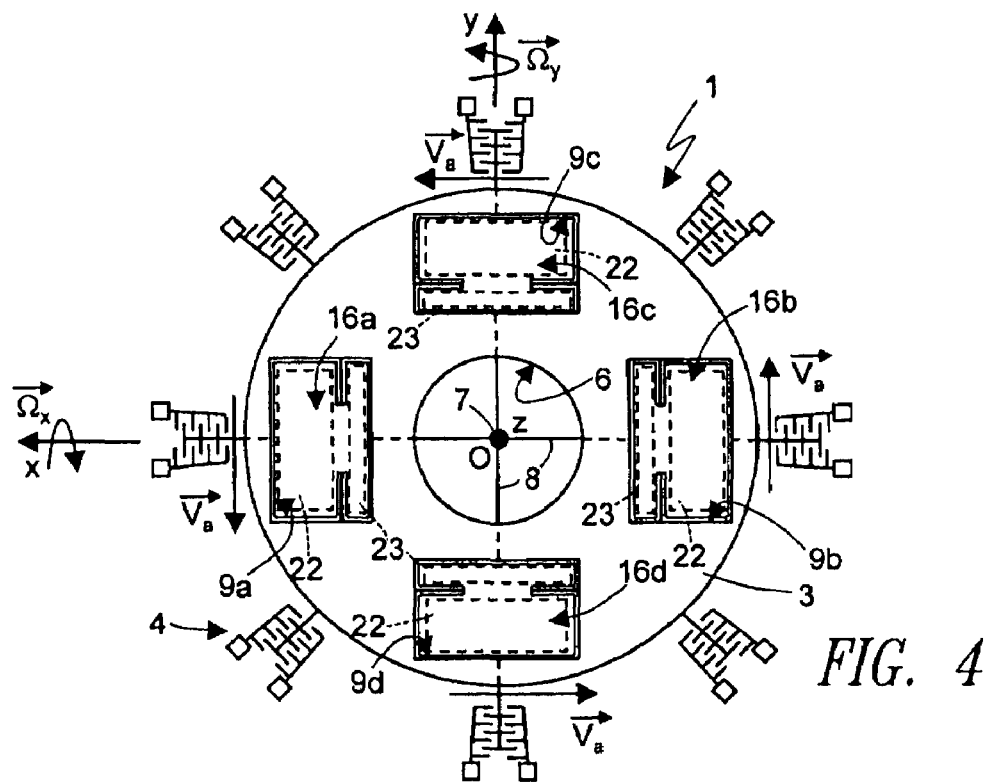
FIG. 4 is a schematic top plan view of a second embodiment of the microelectromechanical structure.

According to an embodiment of the present invention, a microelectromechanical sensor structure comprises a single driving mass, anchored to a support in a single central point and driven with rotary motion about an axis, which passes through the central point and is orthogonal to the plane of the driving mass. In particular, the rotation of the driving mass enables two mutually orthogonal components of driving velocity in the plane of the mass. At least one through opening is provided inside the driving mass, in which a sensing mass is arranged; the sensing mass is enclosed within the driving mass, suspended with respect to the substrate, and connected to the driving mass via flexible elements. The sensing mass is fixed to the driving mass during its rotary motion, and has a further degree of freedom of movement as a function of an external stress, in particular a Coriolis force acting on the sensor. The flexible elements, according to their particular construction, allow the sensing mass to perform a rotary movement of detection about an axis lying in the plane of the sensor or else a linear movement of detection along an axis lying in the plane of the sensor in response, respectively, to a Coriolis acceleration acting in a direction perpendicular to the plane and to a Coriolis acceleration acting in a direction lying in said plane. Said movement is in any case substantially decoupled from that of the driving mass. As will be described in detail hereinafter, the microelectromechanical structure, in addition to being compact (in so far as it envisages just one driving mass that encloses in its overall dimensions one or more sensing masses), enables with minor structural modifications, a uniaxial, biaxial or triaxial gyroscope (and/or possibly an accelerometer, according to the electrical connections implemented) to be obtained, at the same time ensuring an excellent decoupling of the driving mass from the sensing mass during the movement of detection.

In detail, and with initial reference to FIG. 1, a microelectromechanical sensor structure 1 according to a first embodiment of the invention comprises a driving structure formed by a driving mass 3 and by a driving assembly 4. The driving mass 3 has, for example, a generally circular geometry with radial symmetry (other geometries are in any case possible), with a substantially planar configuration having a main extension in a plane defined by a first axis x and by a second axis y (referred to in what follows as "plane of the sensor xy"), and negligible dimension, with respect to the main extension, in a direction parallel to a third axis (referred to in what follows as "orthogonal axis z"), forming with the first and second axes x, y a set of three orthogonal axes fixed with respect to the sensor structure. In particular, the driving mass 3 has in the plane of the sensor xy substantially the shape of an annulus, and defines at the centre an empty space 6, the centre O of which coincides with the centroid and the centre of symmetry of the driving mass 3. The driving mass 3 is anchored to a substrate 2 (FIG. 2a) by means of an anchorage 7 arranged at the centre O, to which it is connected through elastic anchorage elements 8. For example, the elastic anchorage elements 8 depart in a crosswise configuration from the centre O along a first axis of symmetry A and a second axis of symmetry B of the driving mass 3, said axes of symmetry being parallel, respectively, to the first axis x and to the second axis y. The elastic anchorage elements 8 enable, as will be clarified hereinafter, a rotary movement of the driving mass 3 about a drive axis passing through the centre O, parallel to the orthogonal axis z and perpendicular to the plane of the sensor xy.

The driving mass 3 moreover has a first pair of first through openings 9a, 9b with a substantially rectangular shape elongated in a direction parallel to the second axis y, aligned in a diametral direction along the first axis of symmetry A, and set on opposite sides with respect to the empty space 6. In particular, as will be clarified hereinafter, the direction of alignment of the first through openings 9a, 9b corresponds to a direction of detection of the microelectromechanical sensor structure 1 (in the case represented in the figure, coinciding with the first axis x).

The driving assembly 4 comprises a plurality of driven arms 10 (for example, eight in number), extending externally from the driving mass 3 in a radial direction and spaced apart at a same angular distance, and a plurality of first and second driving arms 12a, 12b, extending parallel to, and on opposite sides of, respective driven arms 10. Each driven arm 10 carries a plurality of first electrodes 13, extending in a direction perpendicular to, and on either side of, the driven arm. Furthermore, each of the first and second driving arms 12a, 12b carries respective second electrodes 14a, 14b, extending towards the respective driven arm 10 and comb-fingered to the corresponding first electrodes 13. The first driving arms 12a are all arranged on the same side of the respective driven arms 10 and are all biased at a first voltage. Likewise, the second driving arms 12b are all arranged on the opposite side of the respective driven arms 10, and are all biased at a second voltage. In a per se known manner which is not illustrated, a driving circuit is connected to the second electrodes 14a, 14b so as to apply the first and second voltages and determine, by means of mutual and alternating attraction of the electrodes, an oscillatory rotary motion of the driving mass 3 about the drive axis, at a given oscillation frequency.

The microelectromechanical sensor structure 1 further comprises a first pair of acceleration sensors with axis parallel to the orthogonal axis z, and in particular a first pair of first sensing masses 16a, 16b, set, respectively, within the first through opening 9a and the second through opening 9b, so as to be completely enclosed and contained within the overall dimensions of the driving mass 3 in the plane of the sensor xy. The first sensing masses 16a, 16b have a generally rectangular shape, and are formed by a first rectangular portion 17, which is wider, and by a second rectangular portion 18, which is narrower (along the first axis x), connected by a connecting portion 19, which is shorter (in a direction parallel to the second axis y) than the first and second rectangular portions. Each first sensing mass 16a, 16b has a centroid G located within the corresponding first rectangular portion 17, and is supported by a pair of first elastic supporting elements 20 extending from, and connected to, the connecting portion 19 towards the driving mass 3 parallel to the second axis y. The first elastic supporting elements 20 extend at a distance from the centroid G of the respective sensing mass 16a, 16b, and form torsional springs that are rigid for the rotary motion of the driving mass 3, and also enable rotation of the first sensing masses about an axis of rotation parallel to the second axis y and lying in the plane of the sensor xy (and, consequently, their movement outside the plane of the sensor xy).

A first pair of first and second detection electrodes 22, 23 is arranged underneath the first and second rectangular portions 17, 18 of the sensing masses (see also FIG. 2a); for example the detection electrodes are constituted by regions of polycrystalline silicon formed on the substrate 2 and having dimensions substantially corresponding to those of the overlying rectangular portions 17, 18. The first and second detection electrodes 22, 23 are separated, respectively from the first and second rectangular portions 17, 18, by an air gap, and are connected to a read circuit. The first and second detection electrodes 22, 23 hence form, together with the first and second rectangular portions 17, 18 respective detection capacitors $C_1$, $C_2$ (shown only in FIG. 2a).

In a known way, both the driving mass 3 and the first sensing masses 16a, 16b are perforated, to enable chemical etching of an underlying sacrificial layer during the fabrication process and, hence, enable their release from the substrate 2.

In use, the microelectromechanical sensor structure 1 is able to operate as uniaxial gyroscope, designed to detect an angular velocity $\vec{\Omega}_x$ (in FIG. 1 assumed as being counter-clockwise), about the first axis x.

With reference also to FIG. 2b, and on the hypothesis of small displacements of the first sensing masses 16a, 16b and of small rotations of the driving mass 3, the rotary movement of the driving mass 3 and of the first sensing masses 16a, 16b about the drive axis can be represented by a driving-velocity vector $\vec{v}_a$, tangential to the circumference that describes the trajectory thereof. The rotary motion about the first axis x at the angular velocity $\vec{\Omega}_x$ determines a force acting on the entire structure, known as Coriolis force (designated by $\vec{F}_C$). In particular, the Coriolis force $\vec{F}_C$ is proportional to the vector product between the angular velocity $\vec{\Omega}_x$ and the driving velocity $\vec{v}_a$, and is hence directed along the orthogonal axis z, is zero in the points where the driving velocity $\vec{v}_a$ is parallel to the first axis x, and, in the points where it does not go to zero, it is directly proportional to the driving velocity $\vec{v}_a$, and consequently it increases with the distance from the centre O. Over the entire structure, considered as a single rigid body, it is hence possible to identify a distribution of Coriolis forces that vary as the distance from the centre O varies. The resultants of the Coriolis forces $\vec{F}_C$ acting on the first sensing masses 16a, 16b at the corresponding centroid G, cause rotation of the first sensing masses, which move out of the plane of the sensor xy, about an axis parallel to the second axis y and passing through the first elastic supporting elements 20. Said movement is allowed by the torsion of the first elastic supporting elements 20. Instead, the configuration of the elastic anchorage elements 8 is such as to inhibit, to a good approximation, movement of the driving mass 3 out of the plane of the sensor xy, thus allowing effective decoupling of the motion of detection of the first sensing masses from the driving motion. The displacement of the first sensing masses 16a, 16b out of the plane of the sensor xy causes a differential capacitive variation of the detection capacitors $C_1$, $C_2$, the value of which is proportional to the angular velocity $\vec{\Omega}_x$, which can hence be determined in a per-se known manner via a purposely provided read circuit.

In particular, since the reading scheme is differential (see also the subsequent FIG. 7), the presence of a pair of first sensing masses enables automatic rejection of spurious linear accelerations along the orthogonal axis z. Said accelerations, in fact, cause a variation in the same direction of the detection capacitors $C_1$, $C_2$, which is cancelled by the differential reading. The presence of the central anchorage also enables rejection of spurious linear accelerations along the axes x and y, given that the ensemble of elastic anchorage elements 8 is extremely rigid in these directions, and does not consequently enable displacement of the sensing masses. Furthermore, the described structure is able to mechanically reject spurious angular acceleration about the orthogonal axis z, since the frequency response of the sensor can be modeled as a very selective filter.

Given the symmetry of the described structure, the possibility of providing a uniaxial gyroscope sensing rotations about the second axis y is evident. In particular (see FIG. 3), the microelectromechanical sensor structure 1 has, in this case, a second pair of first through openings 9c, 9d (instead of the first pair of first through openings 9a, 9b), which are aligned along the second axis of symmetry B, are of a substantially rectangular shape elongated in a direction parallel to the first axis x, and are arranged on opposite sides with respect to the empty space 6. In addition, the microelectromechanical sensor structure 1 comprises, in this case, a second pair of acceleration sensors with axis parallel to the orthogonal axis z, and in particular a second pair of first sensing masses 16c, 16d (instead of the first pair of first sensing masses 16a, 16b), housed within the through openings 9c, 9d, and completely enclosed and contained within the driving mass 3. The sensing masses 16c, 16d are obtained by rotation through 90° of the sensing masses 16a, 16b, and consequently the corresponding elastic supporting elements 20 extend parallel to the first axis x and enable rotation of the respective sensing masses about an axis of rotation parallel to the first axis x. A second pair of first and second detection electrodes 22, 23 is arranged underneath the first sensing masses 16c, 16d, forming therewith respective detection capacitors $C_1$, $C_2$, in a way altogether similar to what has been described previously. In use, the microelectromechanical sensor structure 1 is able to operate as uniaxial gyroscope, designed to detect an angular velocity $\vec{\Omega}_y$ (in FIG. 3 assumed as being counterclockwise) about the second axis y. The rotary motion about the second axis y causes a Coriolis force, once again directed along the orthogonal axis z, which causes rotation of the first sensing masses 16c, 16d about the axis of rotation parallel to the first axis x, and consequent opposite unbalancing of the detection capacitors.

In an equally evident way (see FIG. 4), it is possible to obtain a biaxial gyroscope sensing rotations about the first and second axes x, y. In this case, the microelectromechanical sensor structure 1 comprises both the first and the second pair of first sensing masses 16a, 16b and 16c, 16d. In particular, a rotation about the first axis x is not sensed by the second pair of first sensing masses 16c, 16d, in so far as the resultant Coriolis force $\vec{F}_C$ is zero (on account of the fact that the vector product between the angular velocity $\vec{\Omega}_x$ and the corresponding driving velocity $\vec{v}_a$ is zero). Likewise, the rotation about the second axis y is not sensed for similar reasons by the first pair of first sensing masses 16a, 16b, and consequently the two axes of detection are not affected and are decoupled from one another.

The solutions described, albeit efficient from many points of view, do not enable rejection of spurious angular accelerations about the axes of detection. For example, in the structure of FIG. 1, whereas a spurious angular acceleration about the first axis x does not cause any appreciable capacitive unbalancing in the first sensing masses 16a, 16b thanks to the rigidity of the first elastic supporting elements 20, a spurious angular acceleration about the second axis y causes the same effects (a differential capacitive variation of the detection capacitors) as the Coriolis force due to rotation about the first axis x.

Figure 5:
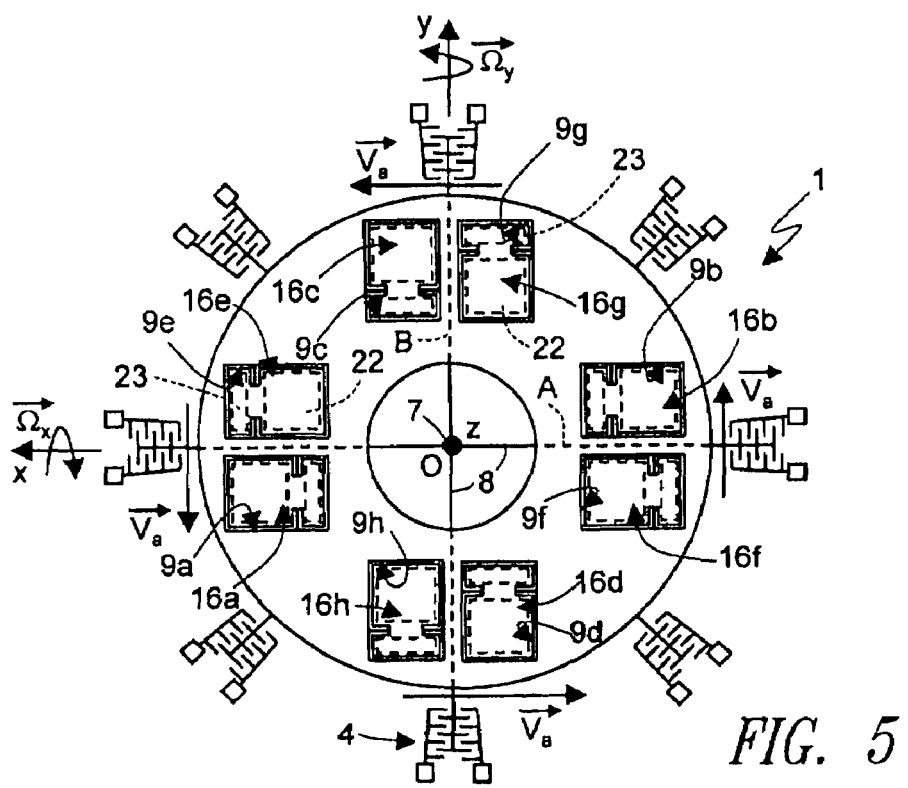
FIG. 5 is a schematic top plan view of a third embodiment of the microelectromechanical structure.

In order to solve said problem, a third embodiment of the invention (shown in FIG. 5), envisages use of a further pair of acceleration sensors with axis parallel to the orthogonal axis z, and hence of first sensing masses for each axis of detection (for a total of eight first sensing masses in the case of a biaxial gyroscope). The microelectromechanical sensor structure 1 comprises in this case: a third pair of first sensing masses 16e, 16f, which co-operate with the first pair of first sensing masses 16a, 16b in detecting angular accelerations about the first axis x and are housed in a third pair of first through openings 9e, 9f; and a fourth pair of first sensing masses 16g, 16h, which co-operate with the second pair of first sensing masses 16c, 16d in detecting angular accelerations about the second axis y and are housed in a fourth pair of first through openings 9g, 9h. In a way similar to what has been previously described, corresponding to the third and fourth pairs of sensing masses are a third and a fourth pair of first and second electrodes 22, 23 arranged underneath the plane of the sensor xy to form detection capacitors.

In detail, the first sensing masses 16a, 16b are in this case misaligned, and arranged on opposite sides with respect to the first axis of symmetry A so as to be symmetrical with respect to the centre O. The first sensing masses 16e, 16f are arranged in a similar way, and are set facing the first sensing masses 16a, 16b with respect to the first axis of symmetry A. Furthermore, the respective elastic supporting elements 20 are staggered along the first axis x, so that to the first rectangular portion 17, which is wider, of one sensing mass, there corresponds the second rectangular portion 18, which is narrower, of the sensing mass facing it. Likewise, the first sensing masses 16c, 16d are arranged on opposite sides with respect to the second axis of symmetry B, and are symmetrical with respect to the centre O. The first sensing masses 16g, 16h are set in positions facing the first sensing masses 16c, 16d on opposite sides of the second axis of symmetry B; the respective elastic supporting elements 20 are staggered along the second axis y.

In use, the described arrangement enables rejection of the spurious angular accelerations about the axes x and y. For example, in the presence of a spurious angular acceleration about the second axis y, the second and fourth pairs of first sensing masses 16c, 16d and 16g, 16h do not generate any appreciable capacitive unbalancing on account of the rigidity of the corresponding first elastic supporting elements 20 (in a way similar to what has been previously described). In addition, the first and third pairs of first sensing masses 16a, 16b and 16e, 16f, if connected electrically in an appropriate way (as will be described in detail hereinafter) give rise to a capacitive unbalancing that generates a common-mode signal, which can consequently be distinguished from the useful differential signal due to the Coriolis force.

In detail (FIG. 6a), in a way similar to what has been described previously, a counterclockwise rotation about the first axis x with angular velocity $\vec{\Omega}_x$ generates a Coriolis force $\vec{F}_C$ that causes opposite inclinations of the first sensing masses of the first and third pair of first sensing masses 16a, 16b and 16e, 16f. Instead (FIG. 6b), a spurious angular rotation about the axis y with angular velocity $\vec{\Omega}_y$ causes inclinations in the same direction of the aforesaid first sensing masses, which consequently give rise to common-mode capacitive variations. Said common-mode variations can be distinguished from the differential ones originated by the Coriolis force, and hence be readily suppressed by a purposely provided read circuit. Clearly, altogether similar considerations apply for detection along the second axis y, given the symmetry of the structure.

FIG. 7 shows a possible embodiment of the electrical connections 24 between the detection capacitors associated to the sensing masses, which enables implementation of the differential-reading scheme previously described. In particular, the first electrodes 22 and the second electrodes 23 of mutually facing sensing masses are connected to one another, and a respective first electrode 22 and a respective second electrode 23 of sensing masses belonging to one and the same pair are connected to one another.

FIG. 8 shows a connection scheme similar to that of FIG. 7, corresponding, however, to the case where the first and second detection electrodes 22, 23 have dimensions that are substantially equal. It is evident that, in the event of spurious angular accelerations, a zero signal, instead of a common-mode signal is obtained, with obvious simplifications of the read circuit.

In the foregoing description, it is assumed to a first approximation that the driving velocity $\vec{v}_a$ acting on the first sensing masses has a direction parallel to the first axis x or to the second axis y, consequently considering the first sensing masses as punctiform and set on one of the axes of symmetry A, B of the structure. Outside this approximation, the rotary driving motion imparted on the first sensing masses by the driving mass 3 generates disturbance, in particular spurious angular velocities, intrinsically linked to the dynamics of motion. Also in this case, the use of eight first sensing masses appropriately connected to one another enables rejection of interferences.

In detail, reference is made to FIG. 9 where once again a counterclockwise rotary driving motion about the drive axis, and a counterclockwise angular motion to be detected about the first axis x at an angular velocity $\vec{\Omega}_x$ are assumed. Each rotating point of the structure, once the distance from the centre of rotation is fixed, has a driving velocity $\vec{v}_a$, tangential to the circumference describing the trajectory thereof, which can be expressed via the vector sum of two components: one first component $\vec{v}_{ax}$ directed along the first axis x, and one second component $\vec{v}_{ay}$ directed along the second axis y. As regards the first and third pairs of first sensing masses 16a, 16b and 16e, 16f, the respective second component $\vec{v}_{ay}$ determines the Coriolis force $\vec{F}_C$ useful for the detection purposes, whilst the respective first component $\vec{v}_{ax}$ in no way contributes to the Coriolis force, in so far as it is parallel to the direction of the angular velocity $\vec{\Omega}_x$. As regards, instead, the second and fourth pairs of first sensing masses 16c, 16d and 16g, 16h, the respective first component $\vec{v}_{ax}$ is parallel to the direction of the angular velocity $\vec{\Omega}_x$ and consequently in no way contributes to the Coriolis force; instead, the respective second component $\vec{v}_{ay}$ gives rise to a force directed along the orthogonal axis z. Said force in turn generates a displacement of the aforesaid sensing masses, which is, however, similar to the one caused by spurious angular accelerations about the first axis x (see FIGS. 6c-6d). It is consequently possible to reject said contribution by a differential reading. A similar reasoning may be applied to the case of detection of an angular velocity about the second axis y.

In the event that only four sensing masses are used (or only two sensing masses, in the case of a uniaxial gyroscope), in the same dynamic conditions (FIG. 10), the second component $\vec{v}_{ay}$ generates a force directed upwards in the left-hand half in which the sensing mass 16d is divided by the second axis of symmetry B, and a similar force directed downwards in the right-hand half of the same sensing mass 16d (the same occurs for the sensing mass 16c). Consequently, said forces tend to cause a bending of the corresponding first elastic supporting elements 20, which, however, on account of their design, are very rigid to bending. Therefore, the entire structure, if appropriately sized, may not feel said disturbance even in the case where only four (or two) first sensing masses were to be used.

A fourth embodiment of the present invention envisages a microelectromechanical structure sensing angular velocities about the orthogonal axis z. Said structure is similar to the ones described previously (so that parts that are similar will be designated by the same reference numbers), but differs as regards the arrangement of the sensing masses (and the movement that these may be allowed by the elastic supporting elements) and as regards the adopted principle of detection. In particular, in this case, through openings made in the driving mass 3 acceleration sensors are provided with axis lying in the plane of the sensor xy (for example, with their axis parallel to the first or to the second axis x, y).

Figure 11:
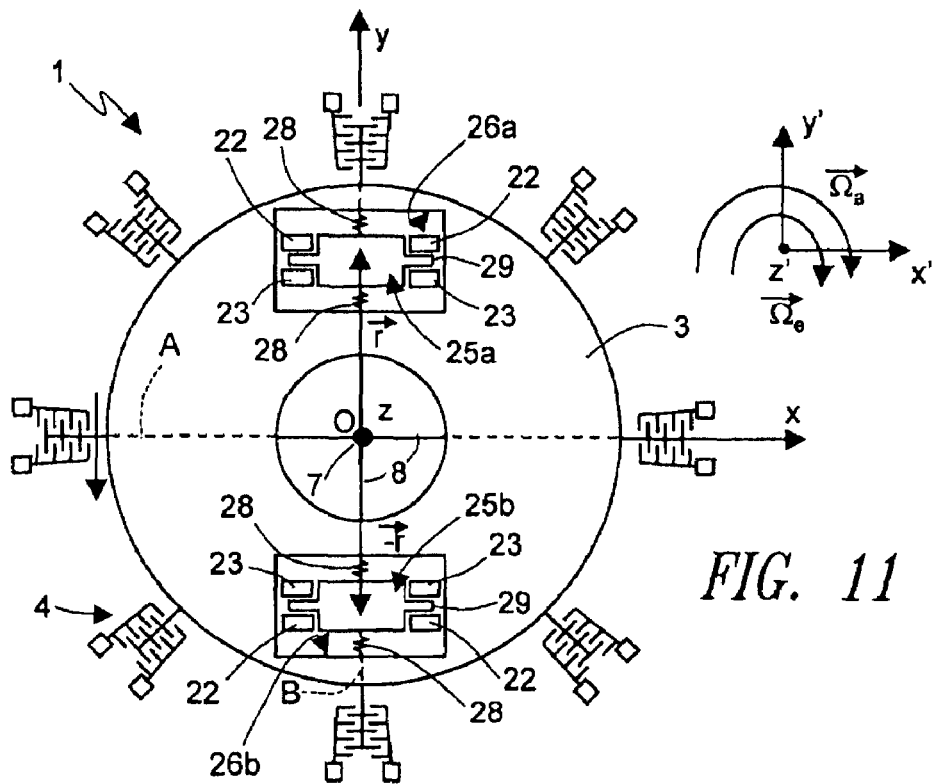
FIG. 11 is a schematic top plan view of a microelectromechanical structure according to a fourth embodiment of the present invention.

In detail (see FIG. 11), the microelectromechanical sensor structure 1 comprises a pair of accelerometers with axis lying in the plane of the sensor xy, and in particular a first pair of second sensing masses 25a, 25b set within a first pair of second through openings 26a, 26b. The second through openings 26a, 26b are rectangular and are aligned in a first radial direction (in the example of FIG. 11 along the second axis y) with their main extension in a direction orthogonal to the first radial direction. The second sensing masses 25a, 25b have a generally rectangular shape with sides parallel to corresponding sides of the second through openings 26a, 26b, are suspended with respect to the substrate 2, and are connected to the driving mass 3 via second elastic supporting elements 28. The second elastic supporting elements 28 originate from a point situated approximately at the centre of main sides of the second sensing masses, and extend in the first radial direction. In particular, the second elastic supporting elements 28 are rigid with respect to the driving motion of the driving mass 3, and exclusively enable a movement in the radial direction of the respective second sensing masses, while hindering movement in other directions (in other words, they are compliant exclusively in the first radial direction). Furthermore, the second sensing masses 25a, 25b have extensions 29 extending from a point situated approximately at the centre of corresponding smaller sides in the direction orthogonal to the first radial direction (in the case represented in the figure, along the first axis x). The extensions 29, together with fixed electrodes anchored to the substrate, facing the extensions 29 and parallel thereto, form detection capacitors with plane and parallel plates. For example, from each smaller side of each second sensing mass 25a, 25b a respective extension 29 originates, facing and set between two fixed electrodes. In a way similar to what has been previously described, it is possible to denote, as first detection electrodes 22, the fixed electrodes arranged in a radially outer position, and as second detection electrodes 23 the fixed electrodes arranged in a radially inner position with respect to the centre. Alternatively, a higher number of electrodes can be provided, comb-fingered to one another. In any event, the detection capacitors are in this case in the plane of the sensor xy.

In use, the driving mass 3 is rotated about the orthogonal axis z with a driving angular velocity $\vec{\Omega}_a$ (for example, clockwise), dragging along with it the second sensing masses 25a, 25b. An external angular velocity $\vec{\Omega}_e$ to be detected, which also acts about the orthogonal axis z, generates a Coriolis force $\vec{F}_C$ on the second sensing masses 25a, 25b directed in the radial direction (hence directed as a centrifugal force acting on the same masses), causing displacement of the second sensing masses and a capacitive variation of the detection capacitors.

In greater detail, consider an inertial reference system O'X'Y'Z'; the reference system OXYZ fixed to the substrate 2, with respect to which the driving mass 3 oscillates, rotates at the external angular velocity $\vec{\Omega}_e$ with respect to the inertial reference system O'X'Y'Z'. Consequently, with respect to the inertial reference system O'X'Y'Z', the microelectromechanical structure has a resultant angular velocity $\vec{\Omega}_r$ equal to the vector sum $\vec{\Omega}_r = \vec{\Omega}_e + \vec{\Omega}_a$ between the external angular velocity and the driving angular velocity. In particular, in this case, the driving angular velocity $\vec{\Omega}_a$ and the external angular velocity $\vec{\Omega}_e$ have the same direction. In the inertial reference system O'X'Y'Z', the microelectromechanical structure is hence subjected to a centrifugal acceleration directed radially having a magnitude equal to $a_{cfg} = \vec{\Omega}_r^2 \cdot r$, where r is the distance from the axis of rotation (i.e., from the centre O). The direction of said acceleration is always radially away from the centre of rotation. If we develop the expression, the centrifugal acceleration $a_{cfg}$ can be expressed with respect to the inertial reference system O'X'Y'Z' as $$a_{cfg} = \vec{\Omega}_r^2 \cdot r = (\vec{\Omega}_a + \vec{\Omega}_e)^2 \cdot r = (\Omega_a^2 + 2 \cdot \Omega_a \cdot \Omega_e + \Omega_e^2) \cdot r$$

The three terms that constitute the expression of the centrifugal acceleration $a_{cfg}$ are $\Omega_a^2 \cdot r$—relative acceleration of the mass in rotation with respect to the reference system OXYZ;

$\Omega_e^2 \cdot r$—drag acceleration of the reference system OXYZ with respect to the inertial system O'X'Y'Z';

$2 \cdot \Omega_a \cdot \Omega_e \cdot r$—Coriolis acceleration; in fact, said term can be re-written as $2 \cdot \Omega_e \cdot (\Omega_a \cdot r)$, where $(\Omega_a \cdot r) = v_a$, i.e., as the result of the vector product $2 \cdot \Omega_e \times \vec{v}_a$.

The same result may be reached by re-writing, for the system described, the general law of composition of accelerations. As is known, given two reference systems, namely, an absolute system O'X'Y'Z' and a relative system OXYZ, the following expression applies:

$$a = a' + a_t + a_c = a' - [a_o + \dot{\omega} \times r' + \omega \times (\omega \times r')] - 2\omega \times v_a$$

where a is the absolute acceleration; a' is the relative acceleration; the term $a_t = a_o + \dot{\omega} \times r' + \omega \times (\omega \times r')$ is the drag acceleration; and the term $a_c = 2\omega \times v_a$ is the Coriolis acceleration. In the case illustrated in FIG. 11, taking into account the fact that r=r' and that the reference systems are both right-handed, the above expression can be rewritten as:

$$a = \dot{\theta}_a^2 r' + \ddot{\theta}_a r' + a_o + \dot{\Omega}_e \times r' + \Omega_e^2 r' + 2\Omega_e(\dot{\theta}_a r')$$

where $\theta_a$ is the angle of rotation of the entire structure with respect to the reference system OXYZ; the term $\dot{\theta}_a^2 r' = \Omega_a^2 r'$ is the term of relative centrifugal acceleration of the entire structure with respect to the reference system OXYZ; the term $\ddot{\theta}_a r'$ is the term of relative tangential acceleration with respect to the reference system OXYZ; $a_o = 0$, since the reference systems OXYZ and O'X'Y'Z' do not move with translatory motion with respect to one another; the term $\dot{\Omega}_e \times r'$ is the term of tangential drag acceleration of the system OXYZ that rotates with angular velocity $\Omega_e$ with respect to the inertial reference system O'X'Y'Z'; $\Omega_e^2 r'$ is the term of centrifugal drag acceleration of the reference system OXYZ that rotates with angular velocity $\Omega_e$ with respect to the inertial system O'X'Y'Z'; $2\Omega_e(\dot{\theta}_a r') = 2\Omega_e(\Omega_a r') = 2\Omega_e \times v_a$ is the Coriolis acceleration.

The terms that represent the tangential accelerations do not have any effect on the dynamics of the sensing masses with respect to the driving mass, in so far as the sensing masses can move only in the radial direction. Consequently, the general expression is equivalent to:

$$a_{cfg} = \vec{\Omega}_r^2 \cdot r = (\vec{\Omega}_a + \vec{\Omega}_e)^2 = \cdot r = (\Omega_a^2 + 2 \cdot \Omega_a \cdot \Omega_e + \Omega_e^2) \cdot r$$

Using a purposely provided read circuit, (for example as described in the patent application EP 04425600.6, filed in the name of the present applicant on Aug. 3, 2004) it is possible to demodulate the capacitive signal, which is proportional to the magnitude of external angular velocity $\Omega_e$, with respect to the driving angular velocity $\Omega_a$. In this way, the only useful signal that enters the bandwidth of the demodulator is associated to the term $2 \cdot \Omega_a \cdot \Omega_e$, which, once demodulated, is found to be equal to $2 \cdot \Omega_e$, and hence proportional to the external angular velocity $\Omega_e$ alone, the value of which is to be determined. The other terms (with the fact that they are raised to the second power) can be easily filtered downstream of the demodulator (in so far as they have twice the original frequency), and for this reason they do not cause any significant disturbance at output. What has been described above has been verified by the applicant with a MATLAB "simulink" model. In conclusion, the microelectromechanical sensor structure 1 modulates the Coriolis acceleration, which, as a result of the way in which the driving dynamics is implemented, has the same direction as the centrifugal acceleration.

As regards the spurious accelerations along the second axis y (but similar considerations apply in the case of detection along the first axis x), they are automatically rejected in so far as reading is performed in a differential way. In fact, whereas the Coriolis useful signal tends to unbalance the second sensing masses 25a, 25b in opposite radial directions (in so far as in the term $2 \cdot \Omega_a \cdot \Omega_e \cdot r$ the vector $\vec{r}$ has opposite directions), the spurious angular accelerations determine contributions having the same sign. By subtracting the two acceleration signals generated by the two acceleration sensors from one another, it is possible to measure the Coriolis contribution and to reject the spurious acceleration along the second axis y.

As regards the spurious angular accelerations along the axis z, these entail a tangential acceleration that does not cause any disturbance to detection along the second axis y.

If, instead, an angular acceleration about the first axis x or the second axis y is applied to the system, the driving mass 3 twists slightly because the elastic anchorage elements 8 at the centre of the structure rigidly oppose bending of the driving mass out of the plane xy. For small rotations along the axis x or y, this entails only ranges of displacement along the axis z for the accelerometer and spurious signals, which again can be intrinsically rejected through the differential reading by the sensor in the plane xy.

Figure 12:
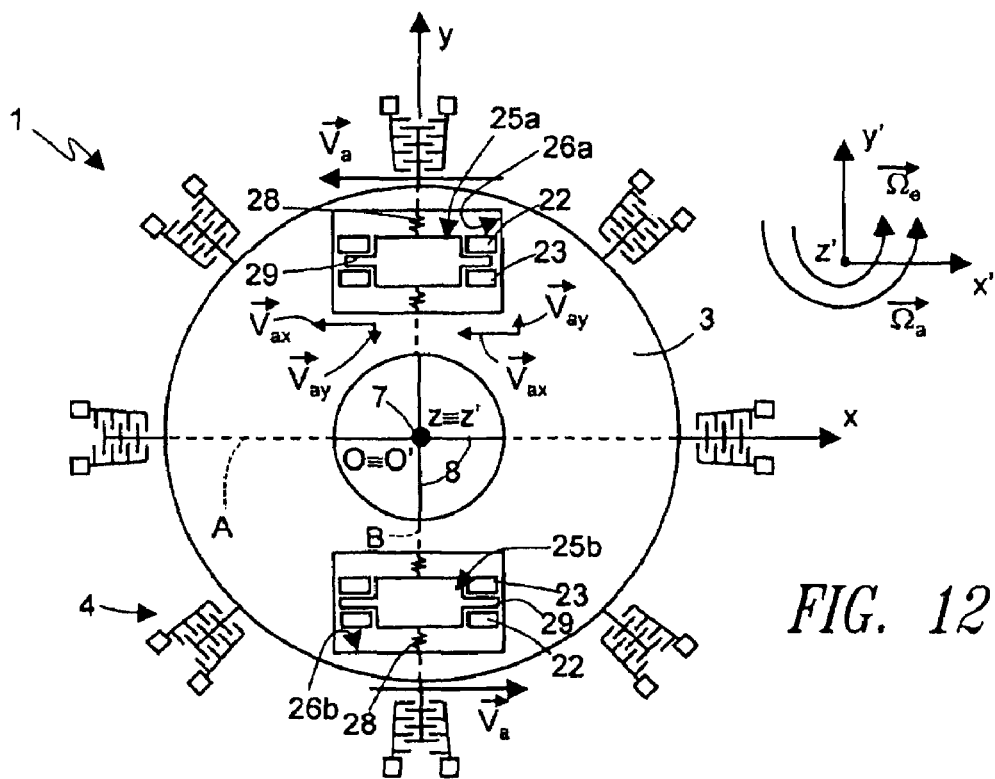
FIG. 12 is a schematic top plan view of the structure of FIG. 11, showing the driving velocity of corresponding sensing masses.

As regards the spurious signals deriving from the rotary driving motion about the orthogonal axis z, reference may be made to FIG. 12, where it is assumed that both the driving angular velocity $\vec{\Omega}_a$ and the external angular velocity $\vec{\Omega}_e$ to be detected have a counterclockwise direction about the orthogonal axis z. In this case, the driving velocity $\vec{v}_a$ acting on the second sensing masses, which is due to the sum of the contributions of the driving angular velocity and the external angular velocity and is tangential to the circumference that defines the trajectory of each second mobile mass having as radius the distance from the centre of rotation, can be decomposed into two components: a first component directed along the first axis x (designated by $\vec{v}_{ax}$), and a second component directed along the second axis y (designated by $\vec{v}_{ay}$). The first component $\vec{v}_{ax}$ gives rise to the term:

$$a_{cfg} = \vec{\Omega}_r^2 \cdot r = (\Omega_a + \Omega_e)^2 \cdot r = (\Omega_a^2 + 2 \cdot \Omega_a \cdot \Omega_e + \Omega_a^2) \cdot r$$

which generates the Coriolis term, whilst the second component $\vec{v}_{ay}$ gives rise, from the cross product with the vector sum $\vec{\Omega}_r = \vec{\Omega}_a + \vec{\Omega}_a$, to a force directed along the first axis x. Given that the second elastic supporting elements 28 are rigid in said direction, the sensor is able to reject said undesirable components of velocity.

In the case of an external angular velocity that lies in the plane of the sensor xy, the components of the driving velocity $\vec{v}_a$ are only due to the driving motion. Their vector product with an external angular velocity that lies on the plane of the sensor xy gives rise to a Coriolis term directed out of the plane of the sensor xy. Also in this case, the second elastic supporting elements 28, at least to a first approximation, do not enable any significant out-of-plane displacements. Consequently, the sensor is able to reject also angular velocities that are not directed along the z axis.

A fifth embodiment of the present invention envisages a triaxial sensor structure (in particular a gyroscope), which is obtained by combining the structures described previously.

Figure 13:
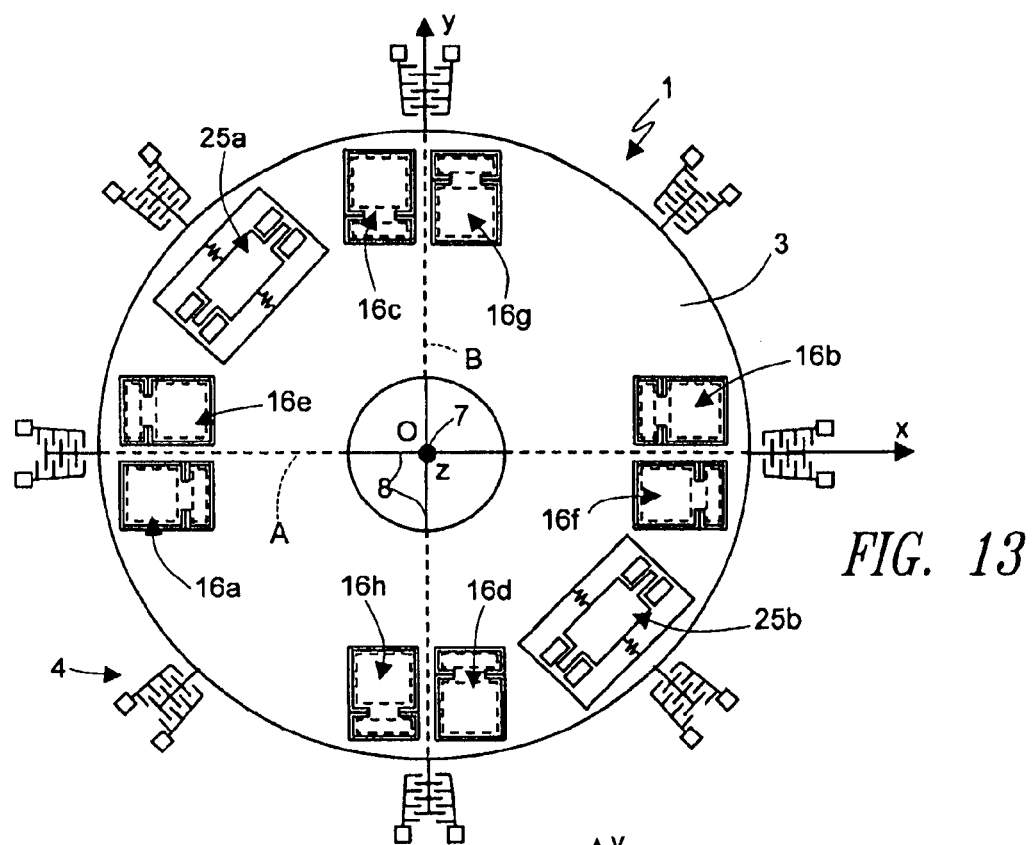
FIG. 13 is a schematic top plan view of a microelectromechanical structure according to a fifth embodiment of the present invention.

In detail (see FIG. 13), the microelectromechanical sensor structure 1 comprises in this case the four pairs of first sensing masses 16a-16h, for detecting, as described previously, angular velocities corresponding to rotations about a first axis of detection and a second axis of detection (the first and the second axes x, y), and also the pair of second sensing masses 25a, 25b for detecting, as described previously, angular velocities corresponding to rotations about a third axis of detection (the orthogonal axis z). It is evident that the second sensing masses 25a, 25b can be aligned in any direction of the plane of the sensor xy, the third axis of detection being orthogonal to the plane of the sensor xy and constituting an axis of yaw out of the plane of the sensor.

Figure 14:
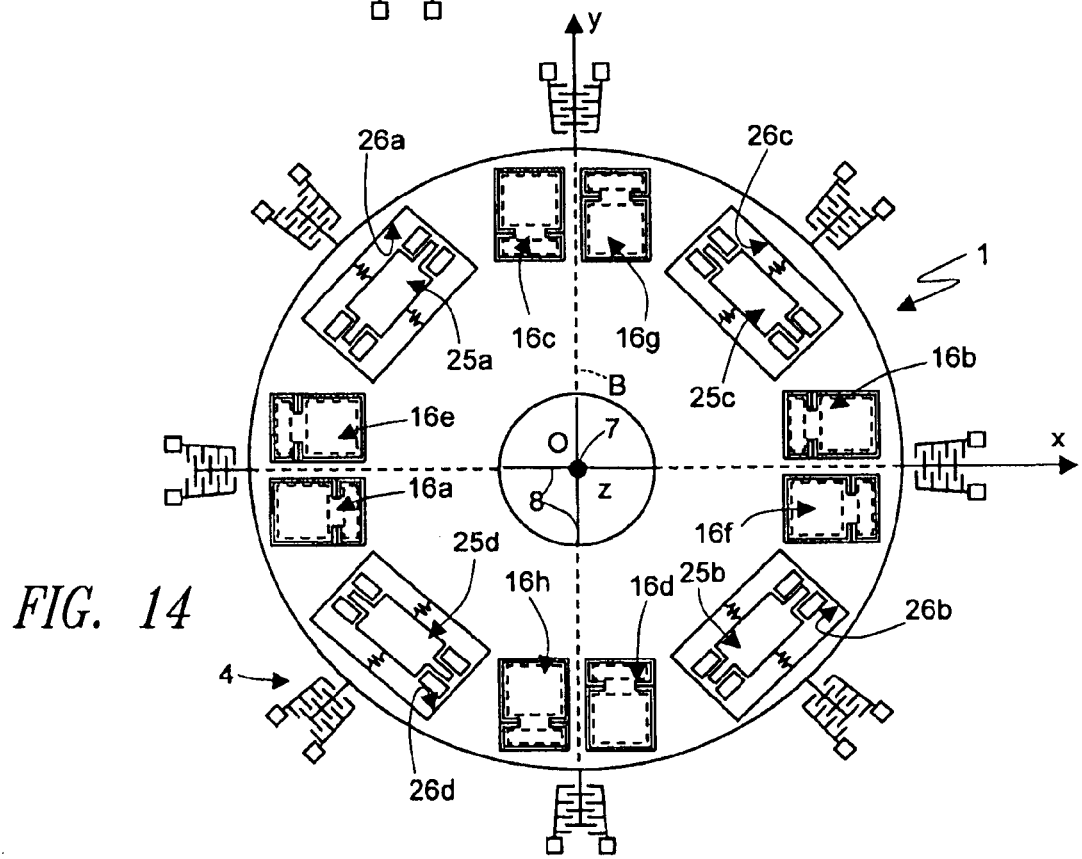
FIG. 14 shows a variant of the structure of FIG. 13.

As shown in FIG. 14, in order to make the structure altogether symmetrical with respect to the centre O, it is moreover possible to provide a second pair of second sensing masses 25c, 25d within a second pair of through openings 26c, 26d, aligned in a second radial direction orthogonal to the first radial direction of alignment of the first pair of second sensing masses 25a, 25b.

Furthermore, according to what is described, for example, in U.S. patent application Ser. No. 11/177,474 filed in the name of the present applicant on Jul. 7, 2005, it is possible to provide an insulation region for electrical decoupling of the driving mass from the sensing masses. Said decoupling enables application of different biasing voltages to the driving and detection structures and thus prevents phenomena of cross-talk and interference in the reading stage.

Figure 15:
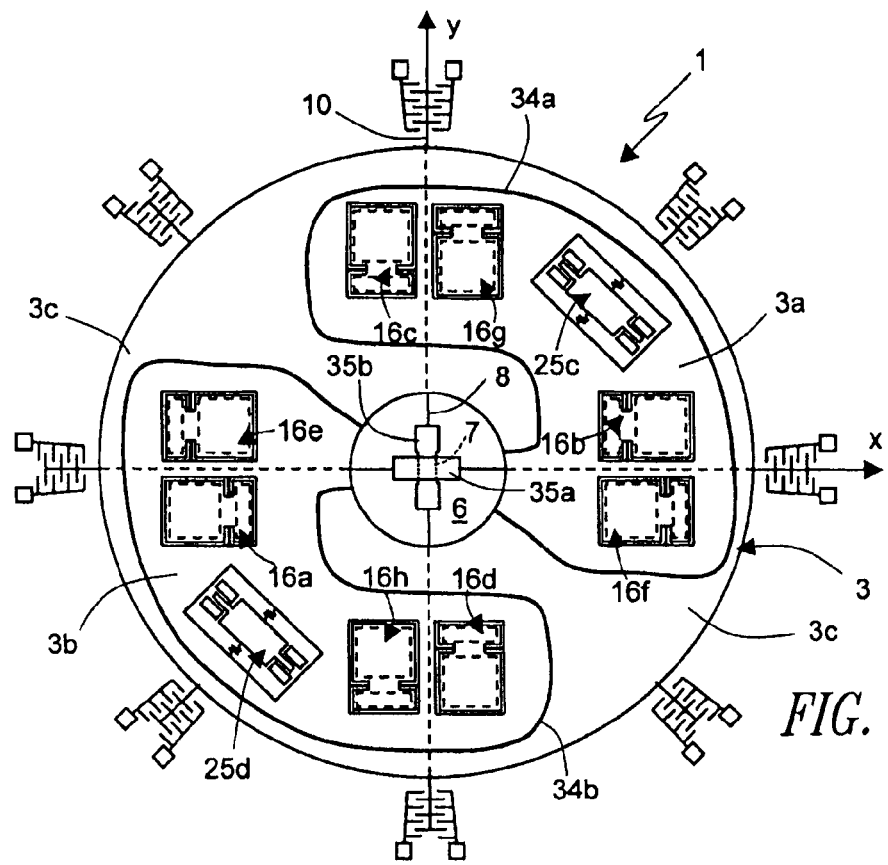
FIG. 15 is a schematic top plan view of a further variant of the structure of FIG. 13, showing electrical-insulation structures.

As illustrated schematically in FIG. 15, the microelectromechanical sensor structure 1 comprises in this case a first insulation region 34a and a second insulation region 34b, which are for example made of silicon oxide, are symmetrical with respect to the centre O, and surround, respectively, a first half and a second half of the first and second sensing masses (in the case represented in the figure, each surrounds four of the first sensing masses and two of the second sensing masses). The first and second insulation regions 34a, 34b have the shape of a ring that is open in a position corresponding to the empty space 6, and do not have any points of contact or intersection. In particular, given that both the driving mass and the sensing masses are formed in one and the same structural layer (epitaxial or pseudo-epitaxial layer), the insulation regions extend in a direction transverse to the plane of the sensor xy throughout the thickness of the driving mass 3, and are closed at the top and at the bottom by plugs, which guarantee, on the one hand, the desired electrical insulation and, on the other, protection of the insulation during manufacturing operations, in particular during a trench etch (deep reactive ion-etching or DRIE of the epitaxial silicon) for definition of the structure, and the etch for removal of sacrificial layers.

The portions of the driving mass 3 that lie within the insulation regions 34a, 34b, referred to as detection portions 3a and 3b, form part of a detection structure and are biased at a detection voltage, whilst the portion that lies outside said insulation regions 34a, 34b, referred to as driving portion 3c, forms part of a driving structure (also forming part of which are, amongst other elements, the driven arms 10) and is biased at a driving voltage. In particular, the detection voltage and the driving voltage are applied, respectively, via a first electrode 35a and a second electrode 35b, which are insulated from one another, are set in a position corresponding to the anchorage 7, and are each fixed to two elastic anchorage elements 8, which connect them to the detection and driving portions, respectively, of the driving mass 3. Notwithstanding the open shape of the rings of the insulation regions 34a, 34b, the "open" portion (i.e., the portion that would lead to closing of the rings) has reduced dimensions if compared with the ones of the entire insulation ring, so that its contribution to leakage is negligible.

According to a further aspect of the present invention, the microelectromechanical sensor structure 1 may be used alternatively as gyroscope (whether uniaxial, biaxial, or triaxial) and as accelerometer (whether uniaxial, biaxial, or triaxial), by simply modifying the electrical connections 24 between the detection capacitors, and particularly between the first and second electrodes 22, 23. In particular, in this case, the aforesaid electrical connections 24 are not established in the design stage, but can be modified by the purposely provided read circuit, for example by using controlled switches.

Figures 16A, 16B:
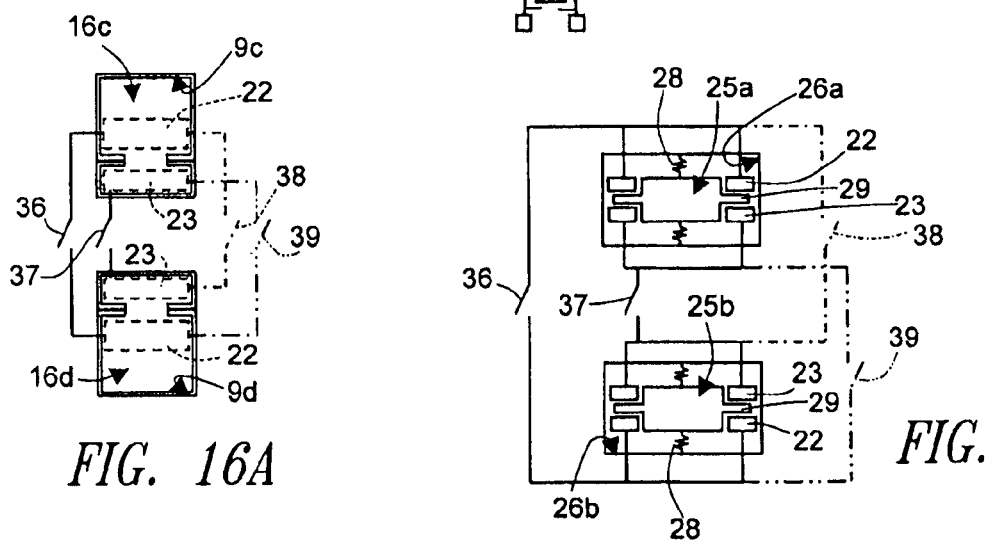
FIGS. 16a, 16b show schemes of connection of capacitors of a portion of the structure of FIG. 13, with possibility of switching between a gyroscope operating mode and an accelerometer operating mode.

By way of example, FIGS. 16a-16b show the scheme of connections of the detection capacitors associated to one pair of first and second sensing masses (for example, the second pair of first sensing masses 16c, 16d, and the first pair of second sensing masses 25a, 25b). In particular, four switch elements are provided, and appropriately controlled by the read circuit: a first switch element 36 and a second switch element 37, which connect, respectively, the first electrodes 22 and the second electrodes 23 to one another; and a third switch element 38 and a fourth switch element 39, which connect a respective first electrode 22 of a sensing mass and a respective second electrode 23 of a different sensing mass of the same pair, to one another.

In detail, the read circuit controls the gyroscope operating mode of the sensor structure, simply by setting the third and fourth switch elements 38, 39 in a closed condition and by setting the first and second switch elements 36, 37 in an open condition; and controls the accelerometer operating mode simply by setting the first and second switch elements 36, 37 in a closed condition and setting the third and fourth switch elements 38, 39 in an open condition. What has been described can also be applied indifferently to the other pairs of sensing masses, and to any described detection structure, whether uniaxial, biaxial, or triaxial.

The advantages of the microelectromechanical sensor structure according to the invention are clear from the foregoing description.

In any case, it is underlined again that it is possible to provide uniaxial, biaxial and in particular triaxial gyroscopes of compact dimensions, given the presence of a single driving mass that encloses in its overall dimensions the sensing masses designed for detection. The rotary motion of the driving mass enables two components of driving velocity, orthogonal to one another in the plane of the sensor, to be automatically obtained, and hence effective implementation of a biaxial detection. Furthermore, the presence of the sensing masses free to move in a radial direction, responsive to the Coriolis force having the same direction as the centrifugal acceleration, enables implementation of a triaxial detection.

The presence of a single central anchorage for the driving mass enables reduction of the thermomechanical stresses (in a per-se known way—see, for example, U.S. Pat. No. 6,508,124 filed in the name of the present applicant, which relates to a microelectromechanical accelerometer), in addition to allowing the aforesaid rotary motion.

The drive and detection dynamics are clearly decoupled from one another, thanks to the particular geometry and arrangement of the elastic supporting and anchoring elements.

The described structure enables a good rejection of spurious linear and angular accelerations and angular cross-velocities for any direction of detection to be obtained.

Figure 17:
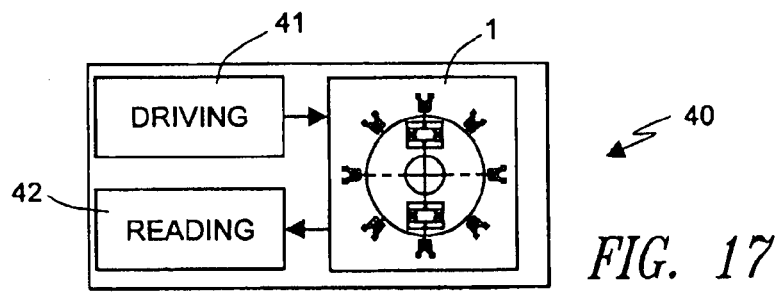
FIG. 17 shows a block diagram of a sensor device provided with the microelectromechanical structure according to one embodiment of the invention.

In addition, it is possible to switch the mode of operation of the microelectromechanical structure between an accelerometer mode and a gyroscope mode by simply modifying the connections between the detection capacitors (an operation that can be carried out by a purposely provided read circuit). In this connection, FIG. 17 illustrates a sensor device 40 comprising: the microelectromechanical sensor structure 1; a driving circuit 41, connected to the driving assembly 4 for imparting the rotary driving motion on the driving mass 3; and a read circuit 42, connected to the detection electrodes 22, 23 and to the switch elements 36-39, for detecting the displacements of the sensing masses and switching the mode of operation (gyroscope mode or accelerometer mode) of the microelectromechanical structure.

Finally, it is clear that modifications and variations can be made to what is described and illustrated herein, without thereby departing from the scope of the present invention, as defined in the annexed claims.

In particular, the driving mass 3 can have a shape different from the circular one, for example any closed polygonal shape. Furthermore, even though this may not be advantageous, said shape may not have a perfect radial symmetry (or in general any other type of symmetry).

In a per-se known manner, the displacement of the sensing masses can be detected with a different technique other than the capacitive one, for example, by detecting a magnetic force.

It is also evident that yet other structures different from the ones shown can be obtained, by appropriately combining pairs of first and second sensing masses; for example, a biaxial gyroscope with axes of detection x-z, or y-z can be obtained.

Furthermore, the torsional moment for causing the driving mass to oscillate with rotary motion can be generated in a different manner, for example by means of parallel-plate electrodes, or else magnetic actuation.

Finally, the microelectromechanical structure, in its simplest embodiment, can comprise a single (first or second) sensing mass, with the disadvantage of not being able to reject linear accelerations in the direction of detection.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. An integrated microelectromechanical structure, comprising:

a driving mass designed to be moved with a rotary motion about an axis of rotation, the driving mass having a central opening, an inner surface defining the central opening, and an outer surface;

an anchorage arranged along said axis of rotation;

elastic anchorage elements configured to anchor the driving mass to the anchorage, the elastic anchorage elements extending between the inner surface of the driving mass and the anchorage;

a first opening provided within said driving mass and positioned between the inner and outer surfaces of the driving mass; and a first sensing mass of a first type arranged inside said first opening and connected to said driving mass via first elastic supporting elements in such a manner so as to perform a first detection movement in a presence of a first external stress, said first elastic supporting elements and said elastic anchorage elements being configured in a manner such that said first sensing mass of the first type fixedly rotates with said driving mass in said rotary motion, and is substantially decoupled from said driving mass in said first detection movement.

2. The structure according to claim 1, wherein said driving mass extends substantially in a plane and said axis of rotation is perpendicular to said plane, said anchorage being arranged substantially at a center of said driving mass.

3. The structure according to claim 2, further comprising a first sensing mass of a second type arranged inside a second opening provided within said driving mass and connected to said driving mass via second elastic supporting elements in such a manner so as to perform a second detection movement in a presence of a second external stress, said first detection movement being a rotational movement about an axis lying in said plane, and said second detection movement being a linear movement along the axis lying in said plane.

4. The structure according to claim 3, wherein said second external stress is a Coriolis force acting in a first radial direction, and said linear movement is directed along said first radial direction.

5. The structure according to claim 1, wherein said driving mass extends substantially in a plane and further comprises:

a second sensing mass of the first type, which is aligned with said first sensing mass of the first type along a first axis of detection lying in said plane and is arranged in a second opening provided within said driving mass, said first and second sensing masses of the first type being enclosed in overall dimensions of said driving mass in said plane;

first detection means associated with said first sensing mass of the first type for detecting said first detection movement, said first detection movement being a rotational movement about an axis lying in said plane and perpendicular to said first axis of detection; and second detection means associated with said second sensing mass of the first type for detecting said first detection movement.

6. The structure according to claim 5, comprising connection means configured to electrically connect the first detection means to the second detection means, said connection means being configured to implement, in given operating conditions, a differential detection scheme.

7. The structure according to claim 6, wherein said connection means is further configured to switch a mode of operation of said microelectromechanical structure between a gyroscope mode and an accelerometer mode.

8. The structure according to claim 6, wherein:

said first detection means comprises a first detection electrode and a second detection electrode, which are set facing said first sensing mass of the first type;

said second detection means comprises a third detection electrode and a fourth detection electrode, which are set facing said second sensing mass of the first type; and said connection means comprises:

a first switch element connecting said first detection electrode and said third detection electrode to one another;

a second switch element connecting said second detection electrode and said fourth detection electrode to one another;

a third switch element connecting said first switch element and said fourth switch element to one another; and a fourth switch element connecting said second switch element and said third switch element to one another, wherein said first and second switch elements are configured in an open condition and said third and fourth switch elements are configured in a closed condition for implementing said gyroscope mode, and said first and second switch elements are configured in a closed condition and said third and fourth switch elements are configured in an open condition for implementing said accelerometer mode.

9. The structure according to claim 1, further comprising:

a second sensing mass of the first type forming with said first sensing mass of the first type a first pair of sensing masses of the first type, aligned along a first axis of detection lying in a plane on opposite sides with respect to said anchorage; and a second pair of sensing masses of the first type aligned along a second axis of detection lying in said plane and orthogonal to said first axis of detection, on opposite sides of said anchorage.

10. The structure according to claim 9, further comprising a pair of sensing masses of a second type aligned in a first radial direction on opposite sides of said anchorage, said pair of sensing masses of the second type being connected to said driving mass via respective second elastic supporting elements in such a manner as to perform a second detection movement in a presence of a second external stress.

11. The structure according to claim 10 wherein the structure is a triaxial gyroscope, wherein said first and second pairs of sensing masses of the first type are configured to detect, respectively, a first external angular velocity and a second external angular velocity about said first and second axes of detection, and said pair of sensing masses of the second type are configured to detect a third external angular velocity about a third axis of detection orthogonal to said plane.

12. The structure according to claim 1, further comprising:

a second sensing mass of the first type forming with said first sensing mass of the first type a first pair of sensing masses of the first type, which are symmetrical to one another with respect to said anchorage and are set on opposite sides of a first axis of detection lying in said plane;

a second pair of sensing masses of the first type, which are symmetrical with respect to said anchorage and are set on opposite sides of a second axis of detection lying in a plane and orthogonal to said first axis of detection; and a further pair of sensing masses of the first type for each of said first and second axes of detection, which are symmetrical with respect to said anchorage and are set on opposite sides of a respective one of said first and second axes of detection with respect to a respective one of said first and second pairs of sensing masses of the first type, wherein corresponding sensing masses of the first or the second pairs associated to one and a same axis of detection are set facing one another with respect to said respective axis of detection wherein the first elastic supporting elements are staggered along said respective axis of detection and coupled to the corresponding sensing masses of the first or the second pairs.

13. The structure according to claim 12, wherein said driving mass includes an empty space at a center and further comprises:

an electrical-insulation region, which electrically insulates a driving portion from a detection portion of said driving mass, which are biased, in use, at different voltages, said electrical-insulation region comprising a first ring surrounding at least a portion of said first and second pairs of sensing masses and a second ring surrounding at least another portion of said first and second sensing masses, said first and second rings having an opening at said empty space, wherein a portion of the driving mass surrounded by the first and second rings includes the detection portion while a portion of the driving mass outside the first and second rings includes the driving portion.

14. The structure according to claim 1, wherein said driving mass has in a plane a circular geometry, having a first axis of symmetry and a second axis of symmetry with an empty space at a center of the driving mass, wherein the center of the driving mass is in a position corresponding to said anchorage, said elastic anchorage elements extending within said empty space.

15. A microelectromechanical device comprising:
an anchorage;
elastic anchorage elements;
a driving mass operable to move in a rotary motion about an axis of rotation, the driving mass being anchored via the elastic anchorage elements to the anchorage arranged along the axis of rotation and the driving mass substantially extending in a plane perpendicular to the axis of rotation;
a first opening and a second opening disposed within the driving mass;
first elastic supporting elements;
a first sensing mass of a first type disposed within the first opening and coupled to the driving mass via the first elastic supporting elements to allow for a first detection movement in response to a first external stress, the first elastic supporting elements and the elastic anchorage elements being configured to fix the first sensing mass of the first type to the driving mass, and wherein the elastic anchorage elements are substantially decoupled from the driving mass during the first detection movement;
second elastic supporting elements; and
a first sensing mass of a second type disposed within the second opening and coupled to the driving mass via the second elastic supporting elements to allow for a second detection movement in response to a second external stress, the first detection movement detected by the first sensing mass being a rotational movement about an axis lying in the plane and the second detection movement detected by the second sensing mass being a linear movement along the axis lying in the plane.

16. The microelectromechanical device of claim 15 wherein the second external stress is a Coriolis force acting in a first radial direction and the linear movement is directed along the first radial direction.

17. The microelectromechanical device of claim 15 wherein the driving mass further comprises:

a second sensing mass of a first type which is aligned with the first sensing mass of the first type along a first axis of detection lying in the plane and is arranged in a respective one of the first opening provided within the driving mass, the first and second sensing masses of the first type being enclosed in overall dimensions of the driving mass in the plane; and detection means for performing the first detection movement of the first and second sensing masses of the first type in response to the first external stress, the first detection movement detects a rotational movement about the axis lying in the plane and perpendicular to the first axis of detection.

18. An integrated microelectromechanical structure, comprising:

a driving mass designed to be moved with a rotary motion about an axis of rotation and anchored via elastic anchorage elements to an anchorage arranged along said axis of rotation;

a first opening being provided within said driving mass;

a first sensing mass of a first type arranged inside said first opening and connected to said driving mass via first elastic supporting elements in such a manner so as to perform a first detection movement in a presence of a first external stress, said first elastic supporting elements and said elastic anchorage elements being configured in a manner such that said first sensing mass of the first type is fixed to said driving mass in said rotary motion, and is substantially decoupled from said driving mass in said first detection movement, wherein said driving mass extends substantially in a plane and said axis of rotation is perpendicular to said plane, said anchorage being arranged substantially at a center of said driving mass; and a first sensing mass of a second type arranged inside a second opening provided within said driving mass and connected to said driving mass via second elastic supporting elements in such a manner so as to perform a second detection movement in a presence of a second external stress, said first detection movement being a rotational movement about an axis lying in said plane, and said second detection movement being a linear movement along the axis lying in said plane.

19. The structure according to claim 18, wherein said second external stress is a Coriolis force acting in a first radial direction, and said linear movement is directed along said first radial direction.

20. The structure according to claim 18, further comprising:

a second sensing mass of the first type forming with said first sensing mass of the first type a pair of sensing masses of the first type, aligned along a first axis of detection lying in a plane on opposite sides with respect to said anchorage; and a second sensing mass of the second type aligned with the first sensing mass of the second type in a first radial direction on opposite sides of said anchorage, said sensing masses of the second type being connected to said driving mass via respective second elastic supporting elements in such a manner as to perform the second detection movement in a presence of the second external stress.

21. The structure according to claim 18, further comprising:
- a second sensing mass of the first type forming with said first sensing mass of the first type a first pair of sensing masses of the first type, which are symmetrical to one another with respect to said anchorage and are set on opposite sides of a first axis of detection lying in said plane;
- a second pair of sensing masses of the first type, which are symmetrical with respect to said anchorage and are set on opposite sides of a second axis of detection lying in a plane and orthogonal to said first axis of detection;
- a third pair of sensing masses of the first type, which are symmetrical with respect to said anchorage and are set on opposite sides of said first axis of detection; and
- a fourth pair of sensing masses of the first type, which are symmetrical with respect to said anchorage and are set on opposite sides of said second axis of detection.

22. An integrated microelectromechanical structure, comprising:
- a driving mass designed to be moved with a rotary motion about an axis of rotation and anchored via elastic anchorage elements to an anchorage arranged along said axis of rotation, wherein said driving mass extends substantially in a plane;
- at least one first opening being provided within said driving mass;
- a first sensing mass of a first type arranged inside said at least one first opening and connected to said driving mass via first elastic supporting elements in such a manner so as to perform a first detection movement in a presence of a first external stress, said first elastic supporting elements and said elastic anchorage elements being configured in a manner such that said first sensing mass of the first type is fixed to said driving mass in said rotary motion, and is substantially decoupled from said driving mass in said first detection movement;
- a second sensing mass of the first type, which is aligned with said first sensing mass of the first type along a first axis of detection lying in said plane and is arranged in a second opening provided within said driving mass, said first and second sensing masses of the first type being enclosed in overall dimensions of said driving mass in said plane;
- first detection means associated with said first sensing mass of the first type for detecting said first detection movement, said first detection movement being a rotational movement about an axis lying in said plane and perpendicular to said first axis of detection;
- second detection means associated with said second sensing mass of the first type for detecting said first detection movement;
- connection means configured to electrically connect the first detection means to the second detection means, said connection means being configured to implement, in given operating conditions, a differential detection scheme, wherein said connection means is further configured to switch a mode of operation of said microelectromechanical structure between a gyroscope mode and an accelerometer mode, wherein:
    - said first detection means comprises a first detection electrode and a second detection electrode, which are set facing said first sensing mass of the first type;
    - said second detection means comprises a third detection electrode and a fourth detection electrode, which are set facing said second sensing mass of the first type; and
    - said connection means comprises:
        - a first switch element connecting said first detection electrode and said third detection electrode to one another;
        - a second switch element connecting said second detection electrode and said fourth detection electrode to one another;
        - a third switch element connecting said first detection electrode and said fourth detection electrode to one another; and
        - a fourth switch element connecting said second detection electrode and said third detection electrode to one another, wherein said first and second switch elements are configured in an open condition and said third and fourth switch elements are configured in a closed condition for implementing said gyroscope mode, and said first and second switch elements are configured in a closed condition and said third and fourth switch elements are configured in an open condition for implementing said accelerometer mode.

23. The structure according to claim 22, further comprising:
- a pair of sensing masses of a second type aligned in a first radial direction on opposite sides of said anchorage, said pair of sensing masses of the second type being connected to said driving mass via respective second elastic supporting elements in such a manner as to perform a second detection movement in a presence of a second external stress.

24. The structure according to claim 22, wherein the second sensing mass of the first type forms with said first sensing mass of the first type a first pair of sensing masses of the first type, which are symmetrical to one another with respect to said anchorage and are set on opposite sides of the first axis of detection, the structure further comprising:
- a second pair of sensing masses of the first type, which are symmetrical with respect to said anchorage and are set on opposite sides of a second axis of detection lying in a plane and orthogonal to said first axis of detection;
- a third pair of sensing masses of the first type, which are symmetrical with respect to said anchorage and are set on opposite sides of said first axis of detection; and
- a fourth pair of sensing masses of the first type, which are symmetrical with respect to said anchorage and are set on opposite sides of said second axis of detection.

25. An integrated microelectromechanical structure, comprising:
- a driving mass designed to be moved with a rotary motion about an axis of rotation and anchored via elastic anchorage elements to an anchorage arranged along said axis of rotation;
- a first opening being provided within said driving mass; and
- a first sensing mass of a first type arranged inside said first opening and connected to said driving mass via first elastic supporting elements in such a manner so as to perform a first detection movement in a presence of a first external stress, said first elastic supporting elements and said elastic anchorage elements being configured in a manner such that said first sensing mass of the first type is fixed to said driving mass in said rotary motion, and is substantially decoupled from said driving mass in said first detection movement;
- a second sensing mass of the first type forming with said first sensing mass of the first type a first pair of sensing masses of the first type, aligned along a first axis of detection lying in a plane on opposite sides with respect to said anchorage;

a second pair of sensing masses of the first type aligned along a second axis of detection lying in said plane and orthogonal to said first axis of detection, on opposite sides of said anchorage; and a pair of sensing masses of a second type aligned in a first radial direction on opposite sides of said anchorage, said pair of sensing masses of the second type being connected to said driving mass via respective second elastic supporting elements in such a manner as to perform a second detection movement in a presence of a second external stress.

26. The structure according to claim 25 wherein the structure is a triaxial gyroscope, wherein said first and second pairs of sensing masses of the first type are configured to detect, respectively, a first external angular velocity and a second external angular velocity about said first and second axes of detection, and said pair of sensing masses of the second type are configured to detect a third external angular velocity about a third axis of detection orthogonal to said plane.

27. An integrated microelectromechanical structure, comprising:

a driving mass designed to be moved with a rotary motion about an axis of rotation and anchored via elastic anchorage elements to an anchorage arranged along said axis of rotation;

a first opening being provided within said driving mass;

a first sensing mass of a first type arranged inside said at least one first opening and connected to said driving mass via first elastic supporting elements in such a manner so as to perform a first detection movement in a presence of a first external stress, said first elastic supporting elements and said elastic anchorage elements being configured in a manner such that said first sensing mass of the first type is fixed to said driving mass in said rotary motion, and is substantially decoupled from said driving mass in said first detection movement, wherein said driving mass extends substantially in a plane and said axis of rotation is perpendicular to said plane, said anchorage being arranged substantially at a center of said driving mass;

a second sensing mass of the first type forming with said first sensing mass of the first type a first pair of sensing masses of the first type, which are symmetrical to one another with respect to said anchorage and are set on opposite sides of a first axis of detection lying in said plane;

a second pair of sensing masses of the first type, which are symmetrical with respect to said anchorage and are set on opposite sides of a second axis of detection lying in a plane and orthogonal to said first axis of detection; and a further pair of sensing masses of the first type for each of said first and second axes of detection, which are symmetrical with respect to said anchorage and are set on opposite sides of a respective one of said first and second axes of detection with respect to a respective one of said first and second pairs of sensing masses of the first type, wherein corresponding sensing masses of the first or the second pairs associated to one and a same axis of detection are set facing one another with respect to said respective axis of detection wherein the first elastic supporting elements are staggered along said respective axis of detection and coupled to the corresponding sensing masses of the first or the second pairs.

28. The structure according to claim 27, wherein said driving mass includes an empty space at a center and further comprises:

an electrical-insulation region, which electrically insulates a driving portion from a detection portion of said driving mass, which are biased, in use, at different voltages, said electrical-insulation region comprising a first ring surrounding at least a portion of said first and second pairs of sensing masses and a second ring surrounding at least another portion of said first and second sensing masses, said first and second rings having an opening at said empty space, wherein a portion of the driving mass surrounded by the first and second rings includes the detection portion while a portion of the driving mass outside the first and second rings includes the driving portion.

* * * * *

UNITED STATES PATENT AND TRADEMARK OFFICE
CERTIFICATE OF CORRECTION

| | | |
|---|---|---|
| PATENT NO. | : 7,694,563 B2 | Page 1 of 1 |
| APPLICATION NO. | : 11/684243 | |
| DATED | : April 13, 2010 | |
| INVENTOR(S) | : Guido Spinola Durante | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 385 days.

Signed and Sealed this

Fifth Day of October, 2010

David J. Kappos
*Director of the United States Patent and Trademark Office*